Dec. 31, 1935. F. E. MILLER 2,026,136
HAND WRAPPING MACHINE FOR SLICED LOAVES OF BREAD
Original Filed April 29, 1932 2 Sheets-Sheet 1
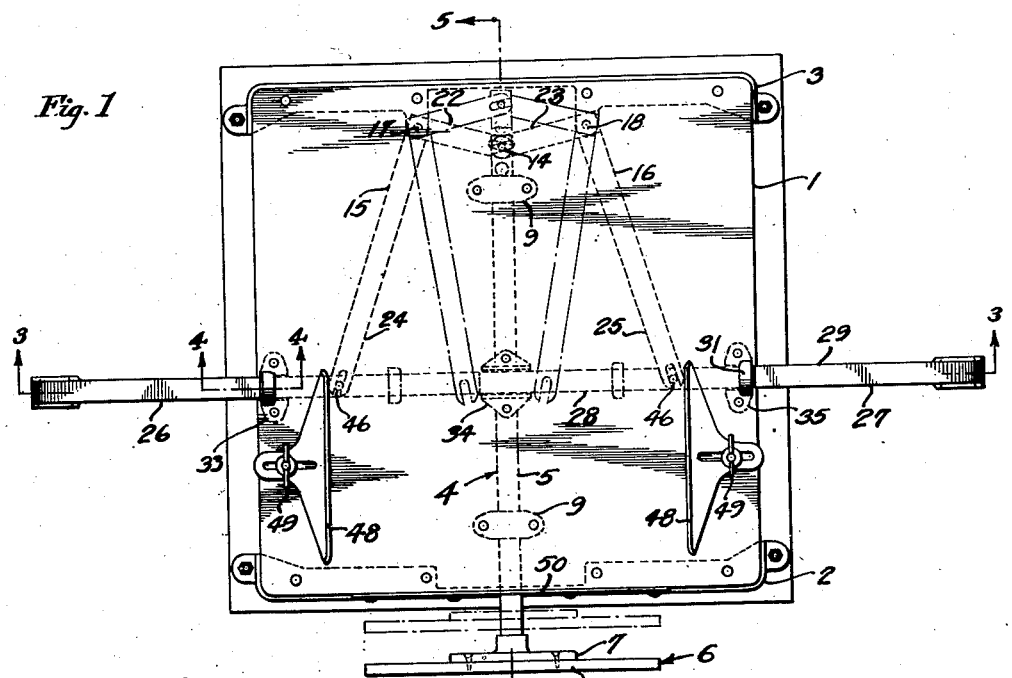
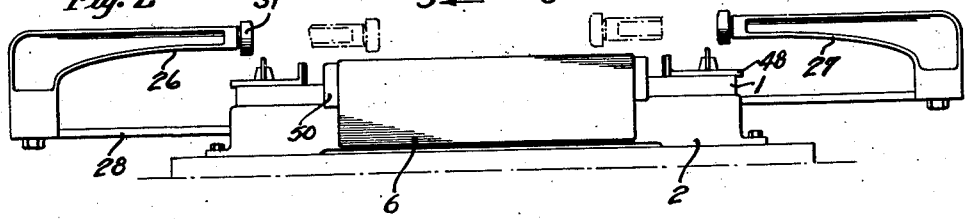
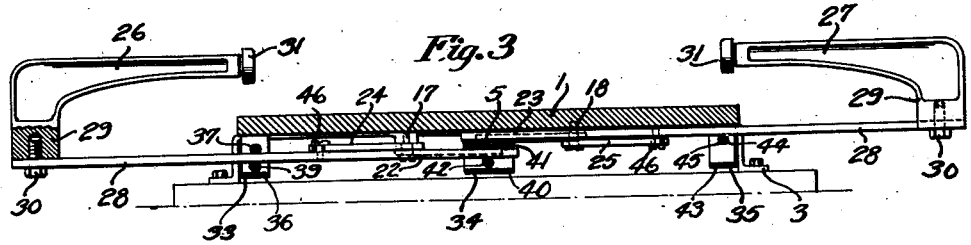
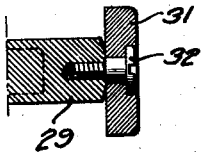
Inventor
Frank E. Miller
By George A. Gruss
his Attorney

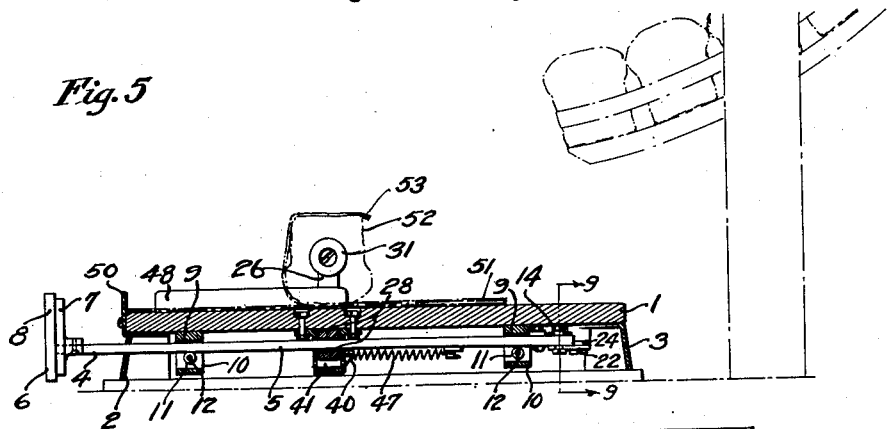
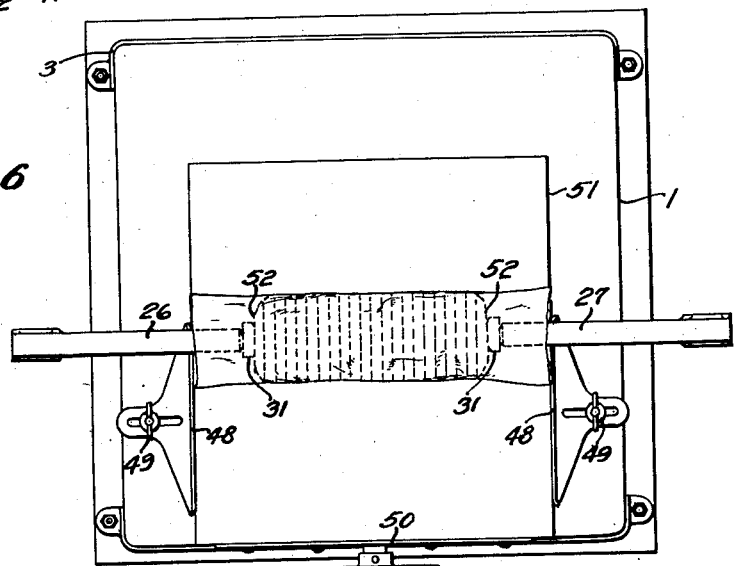
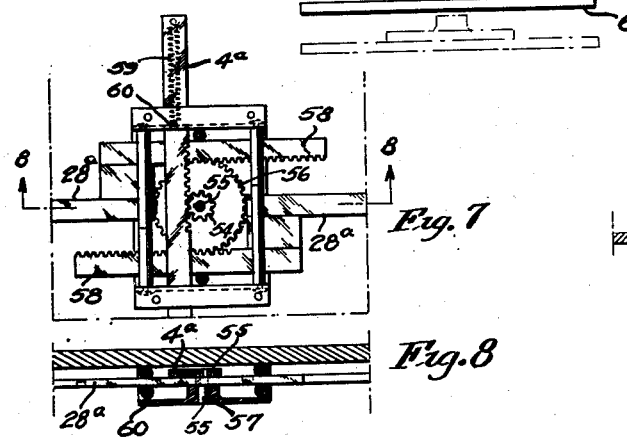
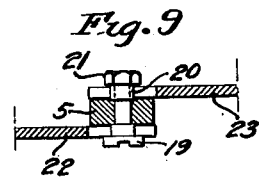

Patented Dec. 31, 1935

2,026,136

UNITED STATES PATENT OFFICE 2,026,136

HAND WRAPPING MACHINE FOR SLICED LOAVES OF BREAD

Frank E. Miller, Berlin, N. J.

Refiled for abandoned application Serial No. 608,197, April 29, 1932. This application December 12, 1934, Serial No. 757,102

6 Claims. (Cl. 93—2)

My invention relates to hand wrapping machines particularly adapted for use in wrapping sliced loaves of bread as disclosed in my abandoned application Serial No. 608,197, filed April 29, 1932.

Sliced loaves upon leaving the bread slicing machine were usually held intact by a band fastened around the ends of the loaf or a tray. This required an operator who also conveyed the intact loaf to the automatic bread wrapping machine. Only the larger bakeries with a high production schedule, found it profitable to use the costly automatic bread wrapping machines. The smaller bakeries wrapped their sliced loaves by hand and this operation was slow and costly because it was difficult to hold the slices together while wrapping unless the bands were used.

The object of my invention is to provide a machine whereby sliced loaves may be wrapped without the use of bands or trays, and the wrapping of sliced loaves will be so facilitated that an operator may wrap a sliced loaf in practically the same time as was required to work with bands or trays to convey the sliced loaf intact to the bread wrapping machine, thus eliminating the need for costly automatic bread wrapping machines.

This object and other advantageous ends which will be described hereinafter, I attain in the following manner, reference being had to the accompanying drawings in which Figure 1 is a plan view of a machine constructed in accordance with my invention, Figure 2 a front view of the machine shown in Figure 1, Figure 3 a section taken on line 3—3 of Figure 1, Figure 4 an enlarged fragmentary section taken on line 4—4 of Figure 1, Figure 5 a section taken on line 5—5 of Figure 1, Figure 6 a plan view similar to Figure 1 showing the parts in another position, Figure 7 a fragmentary sectional plan of a modified form of my invention, Figure 8 a fragmentary section taken on line 8—8 of Figure 7, and Figure 9 a section taken on line 9—9 of Figure 5.

Referring to the drawings 1 indicates a table, preferably of wood, mounted on a front support 2 and a rear support 3 by suitable bolts. An actuating member 4, mounted to move frontward and rearward on the underside of the table, is made up of a bar 5 having a pressure pad 6 on its front end. The pad may be in the form of a foot 7 secured to the bar by a screw or rivet and a plate 8, preferably of wood, secured to the foot by wood screws. The bar rides in a pair of bearings 9 secured to the underside of the table by suitable bolts. Each bearing consists of a bracket 10 and a roller 11 rotatable on a pin 12 secured to the bracket. The rear end of bar 6 is connected at a common point 14 to swing a pair of bell crank levers 15 and 16 suitably fulcrumed on rear support 3 at 17 and 18. Connection 14 may be a pin and slot connection having a shouldered screw 19 passing through bar 5 and a spacer bushing 20 and secured in position by a nut 21. The screw slidably connects with the short slotted arm 22 of bell crank lever 15 on the underside of bar 5 and the bushing slidably connects with the short slotted arm 23 of bell crank lever 16 on the upper side of bar 5.

The bell crank levers may be stamped or forged to shape and in the present construction I have shown the short and long arms of each bell crank lever as being welded to each other at the fulcrum point. The long arms 24 and 25 of bell cranks 15 and 16 have a pin and slot connection with a pair of loaf holders 26 and 27 mounted for movement toward and from each other. Each loaf holder is made up of a slide 28 an extension 29 secured thereto by a screw 30 and a roller 31 rotatably mounted on the end of the extension by a shouldered screw 32 as shown in Figure 4.

Slides 28 ride in bearings 33, 34 and 35. Bearing 33 consists of bracket 36 and a roller 37 above and below left slide 8 rotatably mounted on pins 39 secured in the bracket. Bearing 34 consists of a bracket 40 and three rollers 41 rotatable on pins 42 secured to the bracket. Two of the rollers are positioned between slides 28 and at each side of bar 5 so that slides 28 will travel above and below bar 5 as shown in Figures 3 and 5. The third roller 41 is positioned below the left slide 28. Bearing 35 consists of a bracket 43 and a roller 44 rotatable on a pin 45 secured to the bracket. The roller is positioned below right slide 28.

The long arms 24 and 25 of the bell crank levers are connected to slides 28 by shouldered screws 46 threaded to slides 28 and slidable in slots in the ends of the arms.

It will be seen that by moving actuating member 4 inward, loaf holders 26 and 27 will be moved toward each other as shown in dot and dash lines in Figures 1 and 2. To return the parts to their original position, a spring 47 is connected to bar 5 and a fixed part such as the bracket 40.

The wrapping paper is held in proper wrapping position by a pair of side guides 48 adjustably secured to the table by thumb screws 49 and a front guide 50 secured to the front edge of table 1 by suitable screws.

In use the machine is placed beneath the discharge chute of a bread slicing machine as shown in dot and dash lines in Figure 5. Waxed wrapping paper 51 is placed between side guides 49 and front guide 50 as shown in Figure 6. As the sliced loaves are fed by the slicing machine, the operator in standing position picks a loaf off the chute and places it upside down on the wrapping paper. Pressure pad 6 is then moved inward by the waist of the operator to bring the holders in engagement with the sliced loaf as shown at 52 in Figure 6 to hold the slices together. The operator then brings the front edge of the wrapping paper over the sliced loaf as shown at 53 and rolls the loaf into the paper while it is held in position by rollers 31 as shown in Figure 6. The edges of the wrapping paper now being under the loaf, leave the operator's hands free to continue the wrapping by folding the paper over the ends of the sliced loaf. As the first top fold is being made the holders are brought out of the way by releasing pressure pad 6 and allowing spring 47 to bring the parts to their original position. The side folds are then made and the lower flap is folded under the loaf as it is removed from the machine and placed on any suitable make of hot-plate sealing device which warms the wax and causes the flap to stick to the paper. These same operations are repeated with the next loaf.

In actual practice it has been found that an operator will gradually develop a wrapping speed nearly equal to the slicing speed of the slicing machine.

It is thus seen that with the machine above described, sliced loaves of bread may be wrapped without the use of bands or trays, without the need of a costly automatic bread wrapping machine and without materially increasing the labor.

In Figures 7 and 8 I have shown a modified form of the mechanism which may be used for transmitting movement from the actuating member 4a to the slides 28a of the loaf holders. In this construction a rack on member 4a meshes with a pinion 54 keyed to a shaft 55 keyed to a gear 56 and rotatably mounted in a step bearing 57. Gear 56 meshes with a pair of racks 58 carried by loaf holders 28a. Inward movement of actuating member 4a will cause loaf holders 28a to move toward each other and a spring 59 connected to member 4a and a fixed part such as bracket 60 will return the parts to their original position.

While I have set forth my invention in a particular form, it will be understood that its parts may be changed without affecting the function thereof, and hence I do not limit myself to the precise construction set forth, but consider it my liberty to make such changes and alterations as fairly come within the scope of the appended claims.

Having thus described my invention, what I claim as new and desire to secure by Letters Patent is:—

1. In a machine of the character described, a pair of holders mounted to move toward and from each other, a bar mounted for horizontal movement, a pressure pad on the bar, means operatively connected with the bar and the holder whereby movement of the pad will cause the holders to move toward each other and means operatively connected for returning the holders to their original position.

2. In a machine of the character described, a table, a member mounted for horizontal movement on the underside of the table, slides mounted on the underside of the table for movement toward and from each other, extensions on the slides mounted for movement above the table, and means operatively connected to the slides and said member whereby actuating the member will cause the holders to move toward and from each other.

3. In a machine of the character described, a table, a member mounted for horizontal movement on the underside of the table, slides mounted on the underside of the table for movement toward and from each other, extensions on the slides mounted for movement above the table, and bell crank levers operatively connected to the slides and member whereby actuating the member will cause the holders to move toward and from each other.

4. In a machine of the character described, a table, a member mounted for horizontal movement on the underside of the table, slides mounted on the underside of the table for movement toward and from each other, extensions on the slides mounted for movement above the table, and a pair of bell crank levers fulcrumed on the underside of the table and having one end connected to the slides and the other end to the member.

5. In a machine of the character described, a table, a member mounted for horizontal movement on the underside of the table, slides mounted on the underside of the table for movement toward and from each other, extensions on the slides mounted for movement above the table, and a pair of bell crank levers fulcrumed on the underside of the table and having one end connected to the slides and the other end to a common point on the member.

6. In a machine of the character described, a table, a bar movable lengthwise under the table, a pressure pad on one end of the bar for moving it to holding position, bell crank levers fulcrumed on the table and having one end operatively connected to the other end of the bar, a pair of slides under the table mounted for movement toward and from each other and operatively connected to the other end of the bell crank levers, extensions on the slides mounted to move above the table, rollers rotatably mounted on the extensions and means for returning the bar to its original position.

FRANK E. MILLER.